(12) United States Patent
Bowman

(10) Patent No.: US 9,034,454 B1
(45) Date of Patent: May 19, 2015

(54) COMPOSITE JOINT FILLER SEAL MATERIAL FOR JOINTS IN PRECAST CONCRETE STRUCTURES

(75) Inventor: Stephen Edward Bowman, Greensboro, NC (US)

(73) Assignee: Southern Rubber Company, Inc., Greensboro, NC (US)

(*) Notice: Subject to any disclaimer, the term of this patent is extended or adjusted under 35 U.S.C. 154(b) by 626 days.

(21) Appl. No.: 13/249,478

(22) Filed: Sep. 30, 2011

(51) Int. Cl.
*B32B 3/30* (2006.01)
*B32B 5/16* (2006.01)
*B32B 27/04* (2006.01)
*B32B 27/14* (2006.01)
*B32B 27/40* (2006.01)
*B05D 3/12* (2006.01)
*B05D 7/04* (2006.01)
*B05D 7/24* (2006.01)
*C09D 175/02* (2006.01)
*C09D 175/04* (2006.01)
*E04B 1/68* (2006.01)
*E04B 1/684* (2006.01)
*E02B 3/14* (2006.01)
*E02B 3/16* (2006.01)
*B32B 25/04* (2006.01)

(52) U.S. Cl.
CPC .......... *B32B 25/047* (2013.01); *Y10S 428/9033* (2013.01)

(58) Field of Classification Search
USPC ....................................... 52/396.02
See application file for complete search history.

(56) References Cited

U.S. PATENT DOCUMENTS

| | | | | |
|---|---|---|---|---|
| 1,591,670 A * | 7/1926 | Fischer | | 404/66 |
| 1,709,692 A * | 4/1929 | Swope et al. | | 404/66 |
| 1,961,847 A * | 6/1934 | Fischer | | 404/66 |
| RE20,029 E * | 7/1936 | Fischer | | 404/66 |
| 2,111,113 A * | 3/1938 | Fischer | | 404/40 |
| 2,127,853 A * | 8/1938 | Austin | | 404/65 |
| 2,577,998 A * | 12/1951 | Carter | | 404/66 |
| 3,340,780 A * | 9/1967 | Roediger | | 404/31 |
| 3,726,944 A * | 4/1973 | Bennett et al. | | 525/98 |
| 3,801,421 A * | 4/1974 | Allen et al. | | 428/17 |
| 3,948,009 A * | 4/1976 | Bernhard | | 52/144 |
| 4,112,176 A * | 9/1978 | Bailey | | 428/95 |

(Continued)

FOREIGN PATENT DOCUMENTS

DE 3910140 A1 * 10/1990 ............ E01C 11/02
GB 1116835 A * 6/1968 ............ F16J 15/10

(Continued)

OTHER PUBLICATIONS

Bondaflex, May 2010.*

(Continued)

*Primary Examiner* — Jeff Vonch
(74) *Attorney, Agent, or Firm* — MacCord Mason PLLC

(57) ABSTRACT

An apparatus for filling joints in precast concrete structures includes a core that has exceptionally low creep and conforms to ASTM D 1752 made of controlled particle size composites of recycled cellular rubber and plastic materials in the form of a rectangular slab. Holes are drilled through a central area and countersink recesses are formed around the holes. An outer coating of a thermoplastic polyurethane/polyurea elastomer system of a thickness of 0.075 inch covers the slab and countersink recesses. The coated core is abrasion and UV resistant while having the creep characteristics needed to make a dam expansion joint filler.

13 Claims, 2 Drawing Sheets

(56) References Cited

U.S. PATENT DOCUMENTS

| | | | | |
|---|---|---|---|---|
| 4,559,239 A | * | 12/1985 | Cenegy | 427/140 |
| 4,736,558 A | * | 4/1988 | Taraba, Jr. | 52/309.8 |
| 5,116,653 A | * | 5/1992 | Frandina | 428/58 |
| 5,211,505 A | * | 5/1993 | Ueda | 404/47 |
| 5,865,009 A | * | 2/1999 | Jackson et al. | 52/745.2 |
| 5,935,695 A | * | 8/1999 | Baerveldt | 428/218 |
| 7,592,059 B2 | * | 9/2009 | Lane et al. | 428/71 |
| 2003/0121103 A1 | | 7/2003 | Wempe | 5/654 |

FOREIGN PATENT DOCUMENTS

| | | | | | |
|---|---|---|---|---|---|
| GB | 1166656 | A | * | 10/1969 | |
| GB | 1291248 | A | * | 10/1972 | E01C 11/10 |
| JP | 2010216080 | A | * | 9/2010 | |
| KR | 2008031610 | A | * | 4/2008 | |

OTHER PUBLICATIONS

Evazote, Jul. 2010.*
Line-X, May 2009.*
Machine Translation of DE 3910140 A1, Oct. 1990.*
JD Russell Company, Reflex Specs, Jan. 2009.*
Era Polymers, Elastomeric Spray Systems, Feb. 2011.*
Quantum Chemical, Predicium 180A, Jul. 2011.*
Monmouth to tout "new" solution for expansion joints at World of Concrete, Jan. 2009.*
ASTM D1752, ASTM International, 2013 (no month).*
US Army Corps of Engineers, Olmsted Dam Construction Methodology; 6 pgs. undated admitted prior art.
Monmouth Rubber & Plastics Corp. Bondaflex Manual; undated admitted prior art.
Black Block Archery Targets information from the internet printed Jul. 20, 2011.
Bondaflex information sheet; undated admitted prior art.
Monmouth Rubber and Plastics Corp. description and specification sheet and 2 attachments; undated admitted prior art.

* cited by examiner

COMPOSITE JOINT FILLER SEAL MATERIAL FOR JOINTS IN PRECAST CONCRETE STRUCTURES

BACKGROUND OF THE INVENTION

The U.S. Army Corps of Engineers is constructing a 2,700-foot-long concrete dam across the lower Ohio River called the Olmsted Lock and Dam project, located near Olmsted, Ill. at Ohio River Mile 964.4. Once completed, the new system will replace two existing dams located upstream and downstream of the dam. The Olmsted Dam will enable tows to pass through this busy stretch of river in one hour rather than five. The dam will consist of five Tainter gates and barge-operated wicket gates that can be raised or lowered for navigational purposes. Approximately 60% of the year, during high water, tows will bypass the locks and go over the top of the wicket gate portion of the dam. The project consists of two 110'×1,200' locks and a dam comprised of 5 Tainter gates, 1,400' of barge-operated wickets and a fixed weir.

The dam is being constructed "in-the-wet," or underwater, rather than in dry cofferdams. Precast segments (or shells) are constructed on land and moved into the river where they are placed in their final location underwater. A concrete batch plant set-up adjacent to the river provides the required concrete material to construct the shells. Each shell is constructed in a Precast Yard. This yard will produce 47 concrete shells, the largest of which will weigh in excess of 4,200 tons. Each of the shells which are approximately 102' wide, 125' long, and 35' tall will be moved and lifted by a 5340-ton capacity super-gantry crane. The gantry crane is power-driven on train rails and moves each of the shells slowly to a cradle. When the gantry crane has positioned the shell over the cradle, it then lowers the shells on to the cradle. The cradle then lowers the shells down a long skid-way to the river's edge, partially submerging the shell. After the shell is partially submerged on the cradle, a gantry crane catamaran barge in the river picks the shell off the cradle and transports the shell to a location in the river where the shell will be lowered to the river bottom. Once the shell is lowered into place, the underside of each shell is pumped full of Tremie Concrete. The Tremie Concrete has the capability of solidifying underwater, providing a foundation between the shell and the prepared riverbed. The entire process of building and placing shells won't be completed until the dam stretches across the river from one side to the other side.

Dams may be built in close proximity to seismic fault lines and require a seismic design safety factor. Due to the possibility of seismic activity, the seams between the shells are designed to allow for a small amount of movement.

Products such as Bondaflex sponge rubber expansion joint filler, available from Monmouth R4ubber and Plastics Co., Long Branch, N.J., have been used before to fill gaps between dam sections, providing a level of movement between each of the shells. Bondaflex has the useful feature of compressing slightly under pressure, so that it can be compressed between dam sections and then, as the concrete contracts (thermally or otherwise), the Bondaflex can return to its uncompressed size, continuing to fill the gap between dam sections and providing a level of protection to the dam from seismic events.

Standard Bondaflex products are not adequate for the type of dam construction being used on the Olmstead Dam. Seventy five percent of the shells built require a Bondaflex covering on the Kentucky side of the shell prior to river placement. Since the dam is being constructed from Illinois to Kentucky, the Bondaflex material on the Kentucky side of the shell is exposed to the scouring effects of the Ohio River until the next adjacent shell is placed. Since nature doesn't always cooperate, timing between shell placement could be months or years depending on river elevation. Since the scouring effect from the river is so abrasive, a conventional Bondaflex material would not be able to perform.

SUMMARY OF THE INVENTION

The present invention fulfills one or more of these needs in the art by providing an apparatus for filling joints in precast concrete structures including a core of controlled particle size composite of recycled cellular rubber and plastic materials and an outer coating of a polyurethane rubber composition. Preferably, the core material has exceptionally low creep.

In a preferred embodiment the coating has a thickness of 0.075 inch with a tolerance range of +/−0.031 inch. That is, the coating can have a thickness of from 0.044 inch to 0.106 inch.

Desirably, the core material conforms to ASTM D 1752. The core is preferably Bondaflex B33CS joint filler from Monmouth Rubber & Plastics Corp.

The outer coating may be a thermoplastic polyurethane/polyurea elastomer system, such as Line-X XS-100 sprayable TPU textured system, available from Line-X Company, Winston-Salem, N.C., with its home office in Huntsville, Ala.

In an embodiment the core is a rectangular slab having holes drilled through a central area and countersink recesses around the holes, and the coating covers the slab and countersink recesses.

The invention can also be considered as a method of forming an expansion joint filler for joints in precast concrete structures including providing a rectangular slab of a core of controlled particle size composite of recycled cellular rubber and plastic materials, cutting holes in a central area of the slab and countersinking around the holes, and spraying the slab with an outer coating of a polyurethane rubber composition, including covering countersink areas around the holes with the polyurethane rubber composition.

Spraying the slab may include spraying three passes of the polyurethane rubber composition.

Spraying the slab may include obtaining a coating thickness of 0.075 inch thick with a tolerance range of +/−0.031 inch.

In one embodiment spraying the slab includes heating thermoplastic polyurethane and polyurea while they are separate, passing the heated thermoplastic polyurethane and polyurea under high pressure through a spray gun that mixes the heated thermoplastic polyurethane and polyurea within the spray gun at about a 1:1 ratio, and releasing the mixed heated thermoplastic polyurethane and polyurea at the tip of the spray gun toward the core. Heating may include heating the thermoplastic polyurethane and polyurea to about 120-140 degrees Fahrenheit and maintaining the temperature through a heated hose.

The invention may also be considered to be a method of building a concrete dam structure including forming a first concrete section of the dam structure, affixing an expansion joint filler to a side of the first concrete section by mounting an expansion joint filler having a core with creep meeting ASTM D 1752 covered with an abrasion-resistant thermoplastic polyurethane/polyurea elastomer coating, placing the first concrete section in a final location in a river with river water flowing past the first concrete section, placing a second concrete section in place juxtaposed the first concrete section, including lowering the second concrete section while the second concrete section abuts the expansion joint filler of the first concrete section without degrading the expansion joint filler of the first concrete section so much that it cannot function as an expansion joint filler. The method may include allowing a winter to elapse between the placing of the first concrete section and the placing of the second concrete section.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1A:
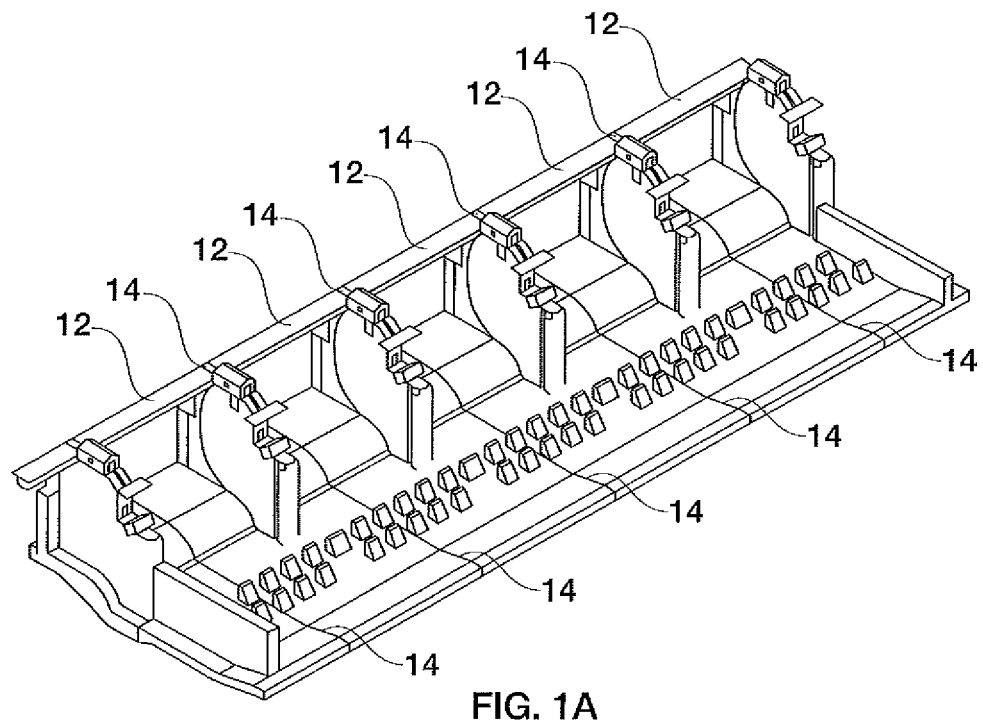
FIGS. 1A and 1B are perspective views of portions of a dam built in accordance with the teachings of the invention.
Figure 1B:
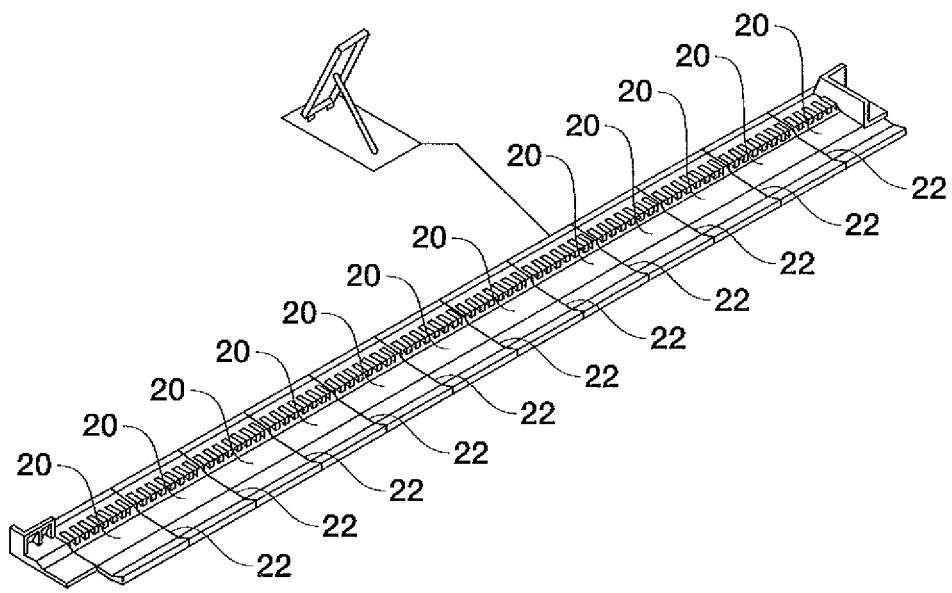

The Olmsted dam will have two primary areas: the Tainter gate section shown in FIG. 1A and the navigable pass section shown in FIG. 1B. It is anticipated to take three construction seasons to build the Tainter gate portion and another three for the navigable pass portion of the dam. A precast concrete yard (PCY) is built of a size to meet this production schedule. The shells required for the upcoming low water season are fabricated in the PCY. Each shell is put into place individually, so subsequent shells are placed abutting already-in-place shells, with the expansion joint filler of the present invention affixed. Typically, the expansion joint filler is affixed to the shell before placing it in the water.

As seen in FIG. 1A, the Tainter gate section is made up of a series of the sectional shells 12. Where the sections come together they abut at seams 14, and the expansion joint fillers in accordance with the invention are applied in those seams 14.

In FIG. 1B, the navigable pass shells 20 abut in similar fashion at seams 22 having seams in accordance with the invention. The expansion joint filler can also be applied to the seam between the Tainter gate and navigable pass sections.

Typically, the expansion joint filler is applied to a shell before the shell is put into place. The expansion joint filler is applied to the face of the shell that will be exposed after placement of the shell, because the previously placed shell already has its expansion joint filler in place from a similar application sequence. Thus, the expansion joint filler on each shell portion stays in place affixed to the shell side waiting the placement of a next shell adjacent to it, which may take several months or even after the passage of a winter. As a result, the expansion joint filler may be exposed to extreme cold, freezing and thawing, river currents, as well as the various sediments and floating components that travel down the river as it moves past the expansion joint filler. The expansion joint filler must survive that exposure and also survive the subsequent placement of the next-in-place shell.

The next shell is moved to its location on a floating gantry. The gantry is moved to place the incoming shell adjacent an in-place shell. The incoming shell is lowered in place adjacent to the already in place shell, connecting to against it. Although sliding of the shells against one another is avoided, some sliding may occur and sliding against a concrete shell face is a highly abrasive event, and conventional Bondaflex or other concrete seam expansion joint filler materials cannot survive such abuse. When the connection between the adjacent shells is complete, the shell's underside is filled with Tremie concrete. The newly placed shell's Tremie concrete makes contact with the previously placed shell's joint material and solidifies, creating an expansion joint filler which provides seismic protection.

Applicant's improved joint filler has been devised to overcome the problems of deterioration of the filler by the river current, environmental exposure and possible sliding abrasion.

Figure 2:
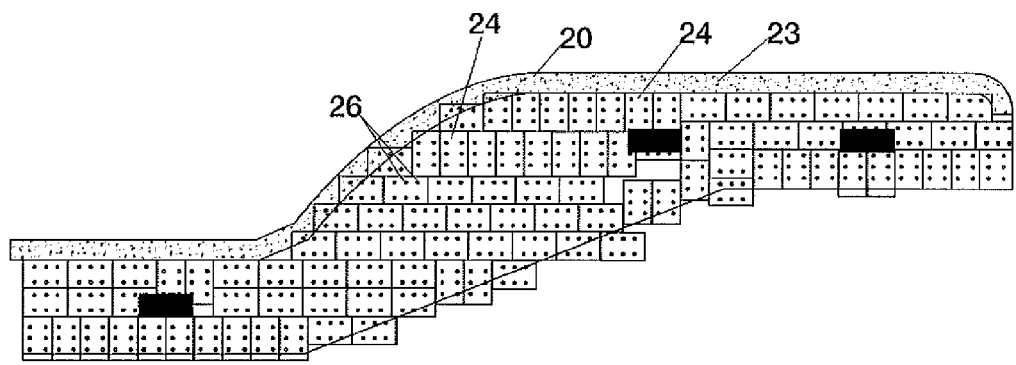
FIG. 2 is an elevational view of the a dam shell showing placement of expansion joint filing elements.

FIG. 2 shows one embodiment of a dam shell section, such as one of the shells of the navigable pass section as an elevation of an end wall of the shell. A plurality of panels 24 of the expansion joint filler material are arrayed over the face of the end wall. The expansion joint filler panels 24 are provided with, in this example, six holes 28 through which pins or connectors 26 pass from the dam shell 23. These connectors 26 can be threaded bolts embedded in the shell. The bolts receive nuts and/or washers in conventional fashion to hold the expansion joint filler panels 24 in place. Although six of the pins and holes are shown in the example shown in FIG. 2, other numbers of such connections can be used. Where the anchor is to pass through the expansion joint filler panel, the holes are formed in the panel and countersunk, so that the anchor does not protrude past the primary surface of the expansion joint filler panel.

Figure 3:
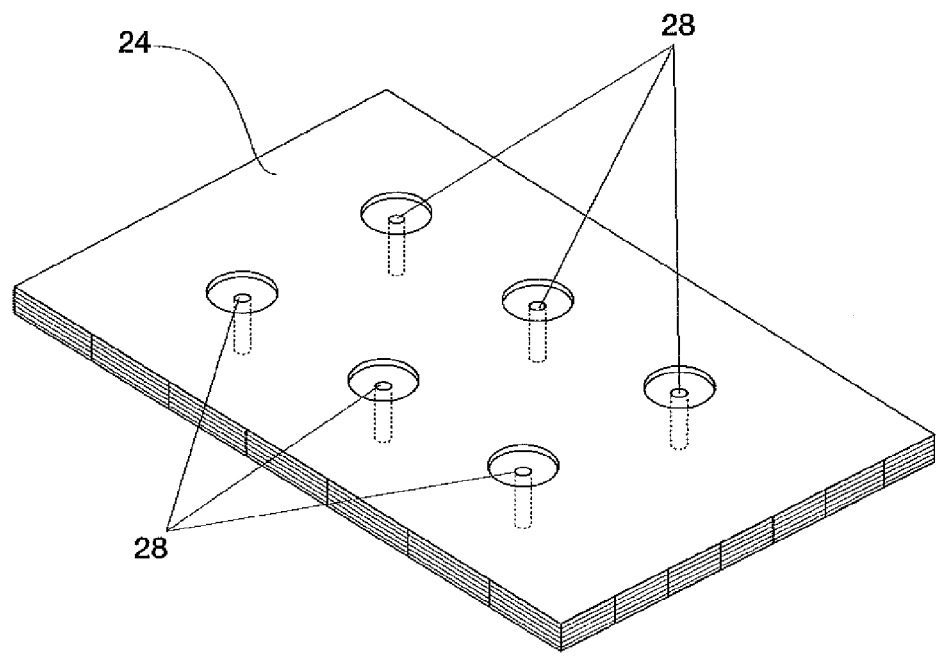
FIG. 3 is a perspective view of a expansion joint filling element in accordance with the invention.

FIG. 3 is a perspective view of an exemplary one of the expansion joint filler panels 24 showing the plurality of holes 26 formed therethrough.

The preferred expansion joint filler is made of a core material that has been coated with an abrasion resistant coating. Any suitable core material can be used that has sufficient properties to meet the design criteria for the dam shell components. Any suitable coating material can also be used that has sufficient toughness to withstand the rigor described above. However, preferred materials for the core and the coating will now be described.

Core

Bondaflex material is a controlled particle size composite of recycled cellular rubber and plastic materials and conforms to ASTM D 1752 (Standard Specification for Preformed Sponge Rubber Cork and Recycled PVC Expansion Joint Fillers for Concrete Paving and Structural Construction). The creep character of Bondaflex makes it suitable for concrete joint expansion joint fillers. Creep is a key factor in designing packaging, component support, as well as many other applications where a consistent and reliable spacing distance must be maintained based on a given force over an extended period of time. In materials science, creep is the tendency of a material to move or to deform permanently to relieve stresses. Material deformation occurs as a result of long term exposure to levels of stress that are below the yield or ultimate strength of a material. Depending on the magnitude of the applied stress and its duration, the deformation may become so large that a component can no longer perform its function.

For example, an application where an elastomeric spacer material of 1" thickness that is used to support a total weight of 50 lbs. depends on the elastomeric material maintaining at least 0.95" of the original 1" thickness in order for the 50 lb. compression to function properly. The creep (compression) of the 1" elastomeric material down to 0.95" and to compress no further over a specified period of time is said to have a creep factor of 5%. The creep factor of an elastomeric material is critical to product performance not only in its ability to maintain spacial integrity but it has a direct effect on vibration, shock attenuation, and noise mitigation.

Bondaflex, with its high mass, particle size geometry and distribution, exhibits exceptionally low creep. This results in the Bondaflex component supporting a given weight with a predicable amount of deflection that does not increase over an extended quantifiable period of time. The preferred Bondaflex is model number B 33CS, which is a sponge rubber expansion joint filler that meets ASTM-D-1752-04 Type 1 and Corps of Engineers CRD-C 509, Type 1.

However, it was not known what affect coating the Bondaflex might have on those properties, which are critical when immense dam sections are placed together in a river bed with a rushing current.

Coating

Applicant has discovered that a polyurethane/polyurea rubber sold to be applied as Line X truck bed liners adequately protects the Bondaflex without disturbing its essential creep values. Line X material is sprayed on the Bondaflex material, and the materials adhere well to one another. Several passes of spray may be needed to obtain a suitable thickness coating for the application. Applicant believes that three standard spray passes provide the correct amount of the coating, namely 0.075 inch thick with a tolerance range of +/−0.031 inch.

The preferred coating material is marketed under the brand name LINE-X, which is a two-component, spray-in-place, 100% solids, thermoplastic polyurethane and polyurea coating. The two separate materials that are dispensed through a high pressure, plural-component, internal mixing polyurethane spray machine. They are each heated to about 120-140 degrees with the temperature maintained through a heated hose. Using high pressure, the materials are mixed internally at a 1:1 ratio at the tip of the spray gun. As the material is applied, it takes less than 5 seconds for it to harden.

LINE-X Protective Coatings are resistant to most solvents and acids. LINE-X coatings have a high "shore D" hardness rating, offering excellent impact resistance and superior tensile strengths (up to 6,600 psi) resulting in outstanding abrasion resistance. Because the material is sprayed, there is a complete seal, making the coating "water tight", at least on the surface sprayed. The LINE-X coatings are resistant to most chemicals including chlorine, gasoline, diesel fuel, bleach, and most household solvents. The preferred outer coating is a thermoplastic polyurethane/polyurea elastomer system, such as Line-X XS-100 sprayable TPU textured system.

Line X XS-100 sprayable Black TPU Textured System is the preferred coating material and has these properties:

| Property | ASTM Test Method | Value |
|---|---|---|
| Density (pcf) | D-1622 | 70 |
| Hardness (shore "D") | D-2240 | 46 |
| Abrasion resistance (taber) | D-4060 | 10%/1000 cycles |
| Tensile strength (psi) | D-2370 | 1800 |
| Elongation (%) | D2370 | 115 |
| Tear resistance (pli) | D-1004 | 304 |
| W.V.T. (grains/hr. sq. ft.) | E-96 | N.A. |
| Color | — | Black |
| LINE X XS-100 LIQUID CHEMICAL PROPERTIES (@75° F.): | | |
| Property | ASTM Test Method | Value |
| Viscosity (cps) | D-1638 | |
| Component "A" | | 600 ± 100 |
| Component "B" | | 1000 ± 100 |
| Specific Gravity (gr/cc) | D-1638 | |
| Component "A" | | 1.15 |
| Component "B" | | 1.08 |
| Mixing Ratio (A:B) | | |
| By volume | | 50:50 |

The expansion joint filler panels 24 are preferably obtained or cut to the desired outer dimensions, then drilled and countersunk to form holes 28. Then the core is subjected to the spray to apply the coating.

The resistance to ultraviolet light degradation is greater for the polyurethane/polyurea elastomer coating than for the Bondaflex, so that having the coating provided by the invention should also enhance the UV resistance of the expansion joint filler. This is an important quality because at least parts of the expansion joint filler will be continually exposed to outdoor conditions.

Certain modifications and improvements will occur to those skilled in the art upon reading the foregoing description. It should be understood that all such modifications and improvements have been omitted for the sake of conciseness and readability, but are properly within the scope of the following claims. The invention has been described with reference to the way it is used at the Olmstead Dam, but those of ordinary skill in the art will be able to use the teachings herein to practice the invention for other dam and non-dam installations.

What is claimed is:

1. An apparatus for filling joints in precast concrete structures comprising
   a core that conforms to ASTM 1752 made of a composite of recycled cellular rubber of controlled particle size and plastic materials in the form of a rectangular slab having holes all the way through the slab through a central area and countersink recesses around the holes, and
   an outer coating of a polyurethane rubber composition that covers the slab and countersink areas around the holes.

2. An apparatus as claimed in claim 1 wherein the core has low creep.

3. An apparatus as claimed in claim 1 wherein the coating has a thickness of 0.075 inch with a tolerance range of +/−0.031 inch.

4. An apparatus as claimed in claim 1 wherein the polyurethane rubber composition is a thermoplastic polyurethane/polyurea elastomer system.

5. An apparatus for filling joints in precast concrete structures comprising
   a core that has low creep and conforms to ASTM 1752 made of a composite of recycled cellular rubber of controlled particle size and plastic materials in the form of a rectangular slab having holes all the way through the slab through a central area and countersink recesses around the holes, and
   an outer coating of a thermoplastic polyurethane/polyurea elastomer system of a thickness of 0.075 inch with a thickness tolerance range of +/−0.031 inch that covers the slab and countersink recesses around the holes.

6. A method of forming an expansion joint filler for joints in precast concrete structures comprising
   providing a core that conforms to ASTM 1752 made of a composite of recycled cellular rubber of controlled particle size and plastic materials in the form of a rectangular slab,
   cutting holes in a central area of the slab and countersinking around the holes,
   spraying the slab with an outer coating of a polyurethane rubber composition, covering countersink recesses around the holes with the polyurethane rubber composition.

7. A method as claimed in claim 6 wherein spraying the slab includes spraying three passes of the polyurethane rubber composition.

8. A method as claimed in claim 7 wherein spraying the slab includes obtaining a coating thickness of 0.075 inch thick with a tolerance range of +/−0.031 inch.

9. A method as claimed in claim 7 wherein spraying the slab includes heating thermoplastic polyurethane and polyurea while they are separate,
 passing the heated thermoplastic polyurethane and polyurea under high pressure through a spray gun that mixes the heated thermoplastic polyurethane and polyurea within the spray gun at about a 1:1 ratio, and
 releasing the mixed heated thermoplastic polyurethane and polyurea at the tip of the spray gun toward the core.

10. A method as claimed in claim 6 wherein heating includes heating the thermoplastic polyurethane and polyurea to about 120-140 degrees Fahrenheit and maintaining the temperature through a heated hose.

11. A method of forming an expansion joint filler for joints in precast concrete structures comprising
 providing a core that conforms to ASTM 1752 made of a composite of recycled cellular rubber of controlled particle size and plastic materials in the form of a rectangular slab,
 cutting holes in a central area of the slab and countersinking around the holes,
 heating thermoplastic polyurethane and polyurea to 120-140 degrees Fahrenheit while they are separate,
 passing the heated thermoplastic polyurethane and polyurea under high pressure through a spray gun that mixes the heated thermoplastic polyurethane and polyurea within the spray gun at a 1:1 ratio,
 releasing the mixed heated thermoplastic polyurethane and polyurea under high pressure through a spray gun that mixes the heated thermoplastic polyurethane and polyurea at the tip of the spray gun onto the slab, covering countersink recesses around the holes with the thermoplastic polyurethane/polyurea elastomer system,
 and making three passes with the spray gun over the slab to obtain a coating thickness of 0.075 inch thick with a tolerance range of +/−0.031 inch.

12. A method of building a concrete dam structure comprising
 forming a first concrete section of the dam structure,
 affixing to the first concrete section an expansion joint filler having a core with creep meeting ASTM D 1752 in the form of a rectangular slab having holes all the way through the slab through a central area and countersink recesses around the holes covered with an abrasion-resistant thermoplastic polyurethane/polyurea elastomer coating that covers the slab and countersink recesses around the holes,
 placing the first concrete section in a final location in a river with river water flowing past the first concrete section,
 placing a second concrete section in place juxtaposed the first concrete section, lowering the second concrete section while the second concrete section abuts the expansion joint filler of the first concrete section without degrading the expansion joint filler of the first concrete section so much that it cannot function as an expansion joint filler.

13. A method as claimed in claim 12 including allowing a winter to elapse between the placing of the first concrete section and the placing of the second concrete section.

\* \* \* \* \*